United States Patent [19]
Chang

[11] Patent Number: 5,241,979

[45] Date of Patent: Sep. 7, 1993

[54] STRUCTURE OF AN ELBOW PIPE

[76] Inventor: Frank Chang, P.O. Box 19-187, Taipei, Taiwan

[21] Appl. No.: 876,398

[22] Filed: Apr. 30, 1992

[51] Int. Cl.⁵ .................. F16L 55/24; E03C 1/282; E03C 1/26; B01D 35/16
[52] U.S. Cl. .................. 137/247.41; 4/292; 4/DIG. 14; 137/550; 210/236; 210/435
[58] Field of Search .................. 137/247.41, 247.51, 137/549, 550; 4/292, 255.01, 256.1, 679, DIG. 14; 210/299, 236, 311, 318, 435, 447

[56] References Cited

U.S. PATENT DOCUMENTS

| | | | |
|---|---|---|---|
| 4,032,455 | 6/1977 | Kale | 137/247.51 |
| 4,164,048 | 8/1979 | Kampfer | 137/247.41 |
| 4,179,762 | 12/1979 | Barnhardt et al. | 137/247.51 |
| 4,230,582 | 10/1980 | Tuleja | 137/247.51 |
| 4,539,718 | 9/1985 | Haer | 4/DIG. 14 |
| 5,038,816 | 8/1991 | Weltsch | 4/DIG. 14 |

Primary Examiner—George L. Walton
Attorney, Agent, or Firm—Bacon & Thomas

[57] ABSTRACT

An improved structure of an elbow pipe having filter to filter waste material contained in polluted water. The filter is provided within a cup which is screwed tight to the bottom region of the pipe and can be easily unscrewed for the removal of the blocked waste material.

4 Claims, 2 Drawing Sheets

STRUCTURE OF AN ELBOW PIPE

BACKGROUND OF THE INVENTION

The present invention relates to an improved structure of an elbow pipe, in particular, an elbow pipe which allows easy disposal of waste within the pipe, and comprises a filter, deposition cup and sealing ring which is formed at the bottom region of the U-shaped tube.

The U-shaped region of an elbow pipe used generally in the dish washer, washing tub is often blocked as a result of debris and waste and causes inconvenience to the users. This is due to the fact that the debris for example, hairs, foodstuff, papers, etc. have entered and struck in the elbow. This will cause the cessation of the smooth flow of water and the formation of bacteria and germs. As a result, the elbow pipe has to be dislocated for cleaning so as to remove the waste material. This means of cleaning is very laborious and troublesome.

Another method of solving the drawback is to add chemicals to dissolve the waste material. However, this chemical dissolves only a portion of the waste material. In other word, this chemical has limited uses. Besides, the frequent use of the chemical agents may pollute the environment.

U.S. Pat. No. 5,038,816 discloses traps for drain pipes. The drain pipe trap has a screen which is mounted vertically within the trap. A removable bottom closure member is attached to the dip portion of the pipe and a screen is placed vertically to trap objects.

SUMMARY OF THE INVENTION

The object of the present invention is to provide structure for an elbow pipe, in which a deposition cup with a filler is mounted.

Another object of the present invention is to provide an improved structure of an elbow pipe, wherein the filter can be easily removed and the deposition cup can be easily installed.

It is another object of the present invention to provide an improved structure of an elbow pipe, wherein the required parts for the structure are fewer, which can be easily molded from plastic material.

It is another object of the present invention to provide an improved structure of an elbow pipe, wherein a sealing ring is mounted to prevent water leakage.

Other features and advantages of the invention will become apparent during the course of the following description.

DETAILED DESCRIPTION OF THE INVENTION

Figure 1:
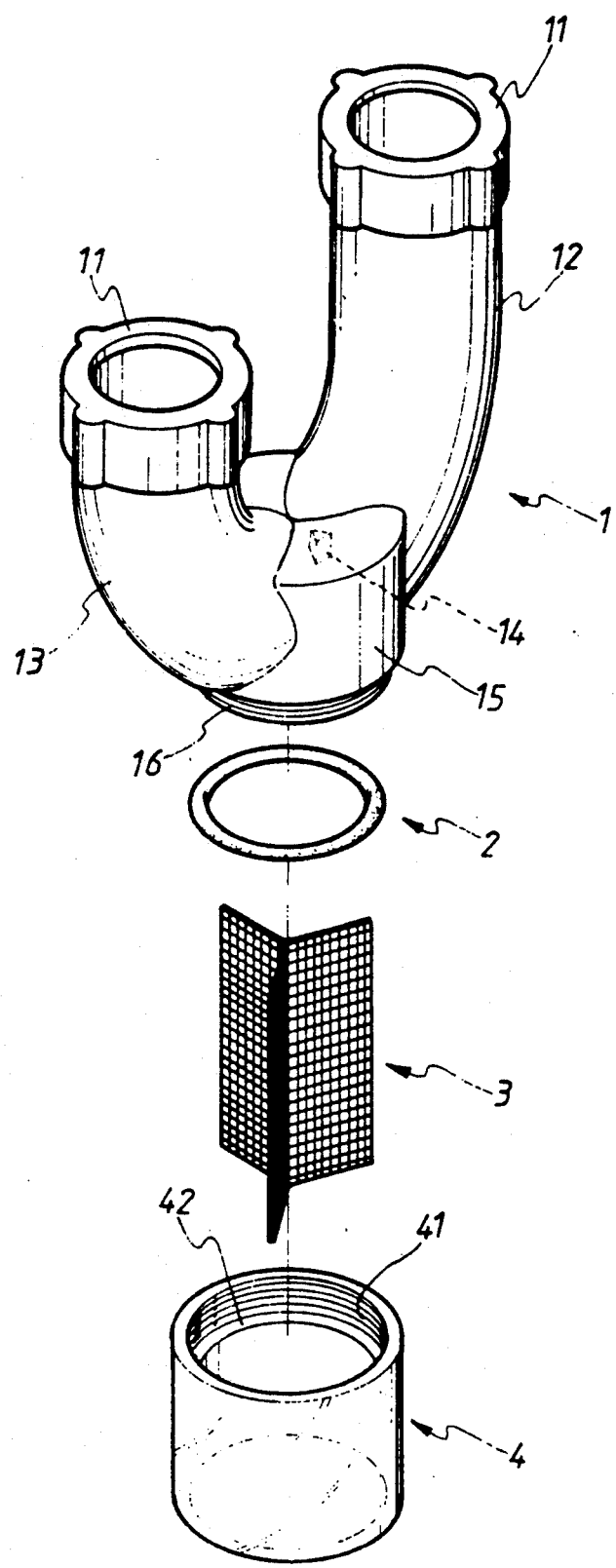
FIG. 1 is a perspective exploded view of the elbow pipe in accordance with the present invention.

Referring to the drawings in detail, wherein like numerals designate like parts, and referring first to FIG. 1, a water storing elbow (1) comprises a sealing ring (2), a filter (3) and deposition cup (4). As shown in FIG. 1, a filter slot (15) is provided at the bottom of the U-shaped region of the elbow pipe (1). The out edge of the bottom region is screw threaded (16). The U-shaped elbow pipe (1) consists of a long pipe (12) and a short pipe (13). The ends for the long pipe (12) and the short pipe (13) are provided with screw cap (11) for the mounting to the drainage pipe of a washing tub. A filter (3) having multiple partition is provided within a deposition cup (4) and the cup (4) is a cup-like structure which is transparent. The inner edge of the cup (4) is provided with screw thread (41) and a step structure (42) is formed at the end of the thread (41). A water sealing ring (2) having a diameter generally the same as that of the step structure (42) is mounted thereto. The cup (4) together with the filter (3) and the sealing ring (2) is screwed tight to the screw thread (16) of the filter slot (15) and fixed thereto. As a result, the water sealing ring (2) is urged to the opening of the filter slot (15) which thus sealed the opening without water leakage from the elbow pipe (1).

Figure 2:
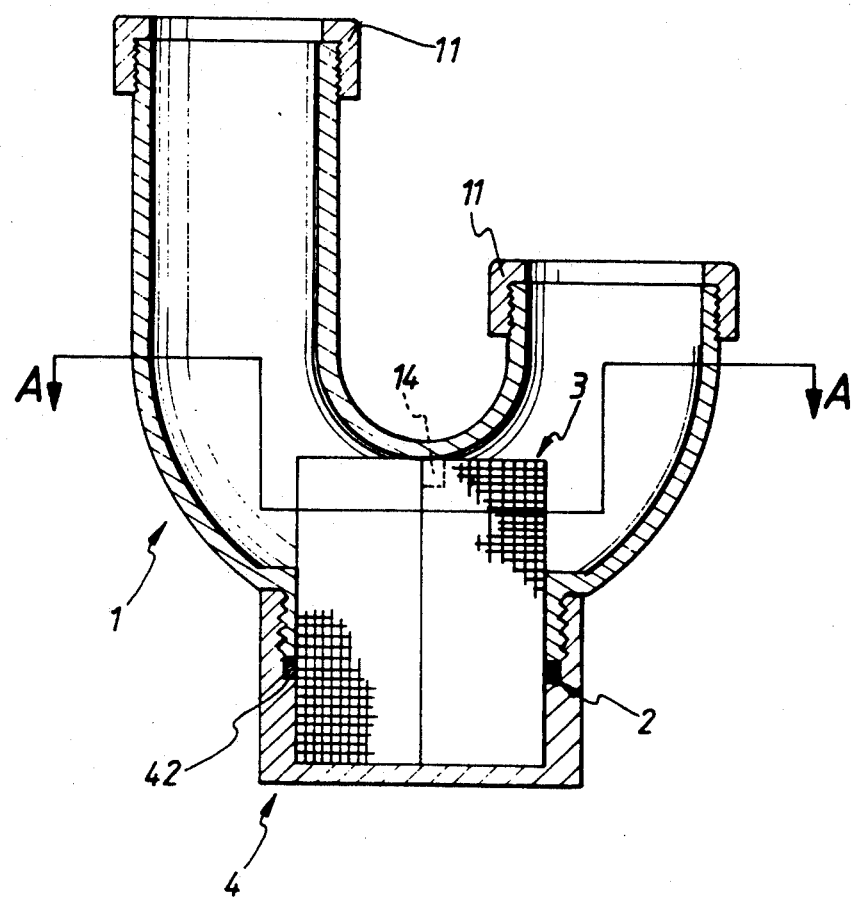
FIG. 2 is a cross section view of the elbow pipe in accordance with the present invention.

FIG. 2 shows the cross section view of the elbow pipe (1) in accordance with the present invention. At the center region of the elbow pipe (1), a protruding block (14) is provided to block the filter (3) when it is mounted within the filter slot (15). As a result, the end face of the filter (3) is closely mounted to the filter slot (15).

Figure 3:
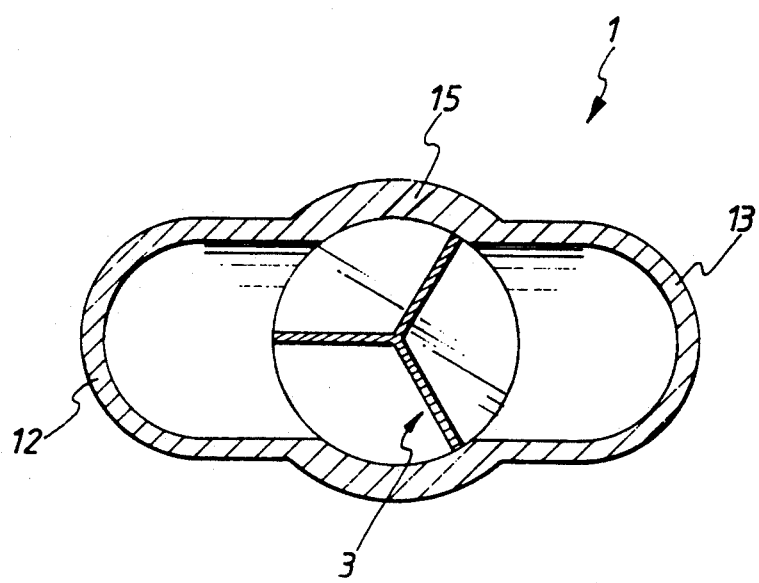
FIG. 3 is a cross section taken through A—A of FIG.

Polluted water containing hairs, paper, etc. enters through (12) is blocked at one edge of the filter (3). Due to the fact that the filter (3) within the filter slot (15) is located at a position by the block (14), (as shown in FIG. 3), it will not move due to the impact of the water flowing. This allows the filter (3) to fully block the waste materials which pass thereon. The removal of the waste material from the cup (4) is determined by the transparent cup (4). If the waste materials are full within the cup (4), the filter (3) is taken out and the waste is discarded, and the cup (4) is mounted thereto.

In accordance with the present invention, the elbow pipe (1) provides easily mounting and dismantling of the cup containing filter (3), and gathering of waste material, it is therefore, useful and effective in removal of the waste materials contained in the polluted water.

It is to be understood that the forms of the invention herewith shown and described and to be taken as preferred examples of the same, and that various changes in the shape, size and arrangement of parts may be resorted to, without departing from the spirit of the invention or scope of the subjoined claims.

What is claimed is:

1. An elbow pipe comprising:
   a) a generally U-shaped, hollow tube comprising:
      an inlet pipe portion, an outlet pipe portion and a curved pipe portion for interconnecting the inlet and outlet pipe portions, a curved pipe portion defining a passage and having means defining a filter opening perpendicular to the curved pipe portion and being in communication with the passage and a generally planar wall located opposite the filter opening;
   b) a filter having a central axis an three filter elements extending along and circumferentially spaced apart around the central axis, opposite ends of the filter being substantially planar, the filter adapted to extend into the passage through the filter opening with two of the filter elements extending upwardly into the inlet and outlet pipe portions and being equally spaced at the center of the curved pipe portion;
   c) a transparent cup member removably attached to the means defining the filter opening, the cup member defining an interior space adapted to receive a portion of the filter therein to inspect the filter along a portion of its length.

d) a protruding block extending into the passage at the curved pipe portion and located so as to contact to extend between two of the filter elements and contact an end of the two filter elements at the central axis to prevent any movement and misalignment of the filter within the passage.

2. The elbow pipe of claim 1 further comprising inter-engaging screw threads on the means defining the filter opening and the cup member to removably attach the cup member thereto.

3. The elbow pipe of claim 1 further comprising sealing ring means operatively associated with the cup member.

4. The elbow pipe of claim 1 wherein the inlet pipe portion is longer than the outlet pipe portion.

* * * * *